United States Patent [19]

Lehtinen et al.

[11] Patent Number: 4,933,554
[45] Date of Patent: Jun. 12, 1990

[54] METHOD OF PRODUCING A CARRIER FOR A PLURALITY OF RADIOACTIVE SAMPLES

[75] Inventors: Kauko Lehtinen, Raisio; Tapio Yrjönen, Turku; Jan Östrup, Kaarina, all of Finland

[73] Assignee: Wallac Oy, Turku, Finland

[21] Appl. No.: 237,060

[22] Filed: Aug. 29, 1988

[30] Foreign Application Priority Data

Sep. 8, 1987 [SE] Sweden .............................. 8703476-5

[51] Int. Cl.$^5$ .............................................. G01T 1/00
[52] U.S. Cl. ...................................... 250/328; 250/303
[58] Field of Search ................................ 250/328, 303

[56] References Cited

U.S. PATENT DOCUMENTS

| | | | |
|---|---|---|---|
| 3,924,128 | 12/1975 | Frank | 250/328 |
| 4,298,796 | 11/1981 | Warner | 250/328 |
| 4,728,792 | 3/1988 | Warner et al. | 250/328 |

FOREIGN PATENT DOCUMENTS

| | | |
|---|---|---|
| 58-168028 | 10/1983 | Japan . |
| 2125183 | 2/1984 | United Kingdom . |
| 0203048 | 11/1986 | United Kingdom . |

OTHER PUBLICATIONS

"A New Design for a Liquid Scintillation Counter for Micro Samples Using a Flat-Bed Geometry", Warner, et al., *Int. J. Appl. Radiation*, vol. 36, No. 10, pp. 819-821, 1985.

*Primary Examiner*—Bruce C. Anderson
*Attorney, Agent, or Firm*—Fred Philpitt

[57] ABSTRACT

In a method of producing a carrier for a plurality of radioactive samples to be monitored in a liquid scintillation counter, wells are provided in a rigid plate (1) of a photon attenuating material in that holes disposed in a matrix configuration are covered from one side of the plate (1) by a first photon permeable foil (2), sample carrying cut-outs (3) from a sorption sheet on which samples have been deposited are placed in said walls a scintillation fluid is added to the wells, and the wells are sealed by a second permeable foil (4) to keep the cut-outs (3) and the scintillation fluid within the respective wells.

4 Claims, 1 Drawing Sheet

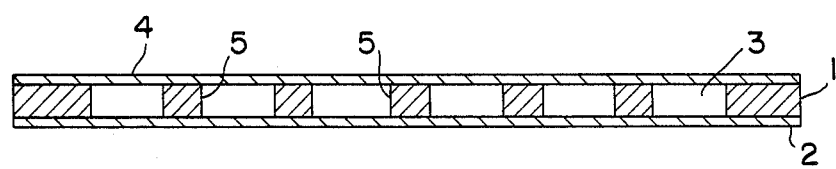

METHOD OF PRODUCING A CARRIER FOR A PLURALITY OF RADIOACTIVE SAMPLES

The invention relates to a method of producing a carrier for a plurality of radioactive samples to be monitored in a liquid scintillation counter.

Such a carrier is known from e.g. U.S. Pat. No. 4,298,796. The carrier according to said patent comprises a filter mat on which radioactive samples are deposited whereupon the filter mat is placed in a container and a liquid scintillant is added.

Another such carrier is known from EP-A1-203048. This carrier comprises a sorption sheet for sorbing a plurality of discrete samples that simultaneously emit photons or beta particles. To prevent optical cross-talk between the samples when monitored, barriers of a photon attenuating material extend through at least a portion of the thickness of the sorption sheet.

A further carrier is known from Int. J. Appl. Radiat. Isot. Vol. 36, No. 10, pp. 819-821, 1985. Here, the filter mat containing multiple radioactive samples, is sealed in a plastic bag with a small quantity of scintillant and placed between rigid supporting plates. The plates are made from black anodized aluminum and provided with holes allowing the samples to be viewed by photomultiplier tubes. Thereby, optical cross-talk is also prevented between the samples.

In all these carrier embodiments liquid scintillant has to be added to the whole filter mat. This is possible if and only if the radioactive samples which are deposited on the carrier do not dissolve from the carrier into the liquid scintillant.

The object of the invention is to bring about a carrier production method by which samples, which may dissolve from the carrier into the liquid scintillant, can be counted.

This is attained by the method according to the invention in that wells are provided in a rigid plate of a photon attenuating material, in that holes disposed in a matrix configuration, are covered from one side of the plate by a first photon permeable foil sample carrying cut-outs from a sorption sheet on which said samples have been deposited, are placed in said wells, a scintillation fluid is added to the wells, and the wells are sealed by a second photon permeable foil to keep the cut-outs and the scintillation fluid within the respective wells.

The invention will be described more in detail below with reference to the accompanying drawing on which the single FIGURE is a cross-sectional view of a multiple radioactive sample carrier produced according to one embodiment of the method according to the invention.

The FIGURE shows a cross-sectional view of a carrier for a plurality of radioactive samples to be monitored in a liquid scintillation counter.

1 denotes a rigid plate of a photon attenuating material e.g. black anodized aluminum or black plastics. The plate 1 is provided with a number of holes disposed in a matrix configuration, e.g. a $6 \times 16$ matrix.

According to the invention the holes in the plate 1 are covered from one side by a photon permeable foil 2, e.g. an adhesive plastic foil.

In the wells thus formed by the plate 1 and the foil 2, sample carrying cut-outs 3 from a sorption sheet (not shown) on which said samples have been deposited, are placed.

Then, a scintillation fluid is added to each cut-out 3 in the respective wells, whereupon the wells are sealed by another photon permeable foil 4 to keep the cut-outs 3 and the scintillation fluid within the respective wells.

The foil 4 may also be an adhesive foil.

At least one of the foils 2 and 4 may be colored to simulate quenching of the radioactive samples.

In order to improve the monitoring of the sample carrying cut-outs 3 in a liquid scintillation counter, the inside walls 5 of the respective wells in the plate 1 may be made photon reflective.

The carrier produced according to the invention, thus, prevents optical cross-talk and is inexpensive and easy to produce.

We claim:

1. Method of producing a carrier for a plurality of radioactive samples to be monitored in a liquid scintillation counter, characterized in that wells are provided in a rigid plate (1) of a photon attenuating material in that holes disposed in a matrix configuration are covered from one side of the plate (1) by a first photon permeable foil (2), sample carrying cut-outs (3) from a sorption sheet on which said samples have been deposited, are placed in said wells, a scintillation fluid is added to the wells, and the wells are sealed by a second photon permeable foil (4) to keep the cut-outs (3) and the scintillation fluid within the respective wells.

2. Method according to claim 1, characterized in that said foils (2, 4) are adhesive foils.

3. Method according to claim 1, characterized in that at least one of the foils (2, 4) is colored to simulate quenching.

4. Method according to claim 1, characterized in that the well walls (5) in the plate (1) are made photon reflective.

* * * * *